April 12, 1960   T. L. GERMAN, JR   2,932,228
SPRING PRESSED PIVOTED STRIPPER MEANS
FOR USE WITH ROTARY CUTTER
Filed Jan. 2, 1958
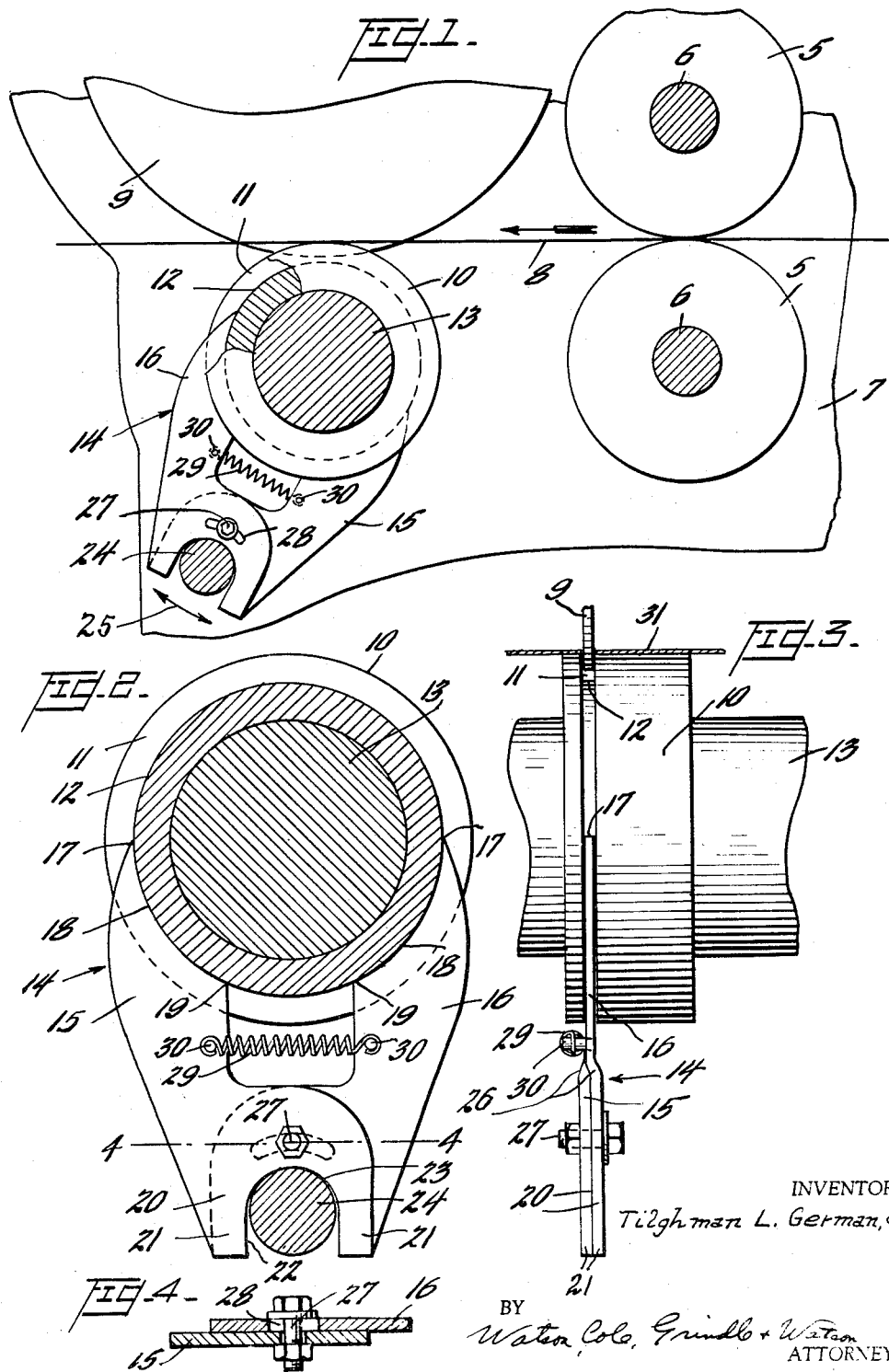
INVENTOR
Tilghman L. German, Jr.
BY
Watson, Cole, Grindle & Watson
ATTORNEYS

United States Patent Office 2,932,228
Patented Apr. 12, 1960

2,932,228

SPRING PRESSED PIVOTED STRIPPER MEANS FOR USE WITH ROTARY CUTTER

Tilghman L. German, Jr., Baltimore, Md., assignor to Greenwood Engineering Company, Inc., Baltimore, Md., a corporation of Maryland Application January 2, 1958, Serial No. 706,801

4 Claims. (Cl. 83—114)

This invention relates to a stripper device for use on a printer slotter and similar machines.

It is an object of the invention to provide a double cleaning member which is spring actuated to maintain the stripping members in the respective slot of a circular knife member. It is a further object of the invention to provide a pair of cooperating stripping members with a contact and cleaning member at one end and a fork member at the other end to cooperate with an adjusting rod or bar. A still further object of the invention resides in the provision of a pair of stripper members pivoted to each other and provided with a tension spring to urge the stripper members toward each other.

Another object of the invention resides in the provision of two interengaging stripper members each of which is stamped and pressed into its specific configuration having a stripping blade at one end and a slot at the other end to engage with a lower stripper shaft. A still further object of the invention resides in the provision of a pair of stripper members with spring interconnection and a pivot connection for relative movement of the stripper members. Each stripper has a sharp edge and a rather long and curved surface to slide in the bottom surface of the grooved knife.

Further objects will be apparent from the following description when considered in connection with the accompanying drawing in which:

Figure 1 is a side elevation partly in section showing the spring stripper in engagement in the slot of the knife blade, Figure 2 is a cross section through the lower slotter head and the lower stripper shaft with the spring stripper in side elevation, Figure 3 is an end elevation of the spring stripper and the lower slotter head, and Figure 4 is a section through the fork end members of the spring stripper taken on line 4—4 of Figure 2.

Figure 1 shows a portion of a corrugated container machine in which the opposed feed rollers 5 are mounted on shafts 6 in the machine frame 7 with 8 indicating the path of movement of a blank or sheet of cardboard 31. From the feed rollers 5 the cardboard passes between two cooperating knives 9 and 10 of which the knife 9 is in the form of a knife disk which projects partly into a slot 11 in the lower knife 10. The circumferential slot 11 has a bottom surface 12 and as shown the slotter knife 10 is mounted on a shaft 13 which rotates the slotted knife disc.

Figures 2 and 3 shows the lower slotter head 10 provided with a spring stripper 14 consisting of two opposed stripper members or cardboard clearing elements 15 and 16. Each element 15 and 16 is provided with a rather sharp end 17, a curved contact surface 18 and a butt end 19. Also each element has a fork member 20 consisting of two prongs 21 to provide a U-shaped slot 22 with a curved surface or bottom portion 23 to engage a bar or rod 24 which latter is movable in the direction of the arrow 25 of Figure 1 and which is termed a lower stripper shaft. The bar or rod 24 is movable in the direction of the double arrow 25 by any suitable mechanical means, not shown or by manual adjustment where desired.

As best shown in Figure 3 each element 15 and 16 has a lateral off-set portion starting at 26 so that the lower fork ends 20 are adjacent to each other and in side contact with the upper ends with the parts 17, 18 and 19 of each element being provided in the same plane to effect a perfect contact in the slot 11 of the lower knife blade 10. A bolt 27 interconnects the blade elements 15 and 16 to each other and this bolt passes through a curved slot 28 in the stripper 16. As shown the slots 22 coincide with each other so that the strippers 15 and 16 will fan out from the lower stripper shaft 24 as a center and are adjustable thereby.

A coiled tension spring 29 is connected to projecting pins 30 one on each stripper element 15 and 16. As shown the spring 29 pulls the elements 15 and 16 toward each other. As shown in Figures 1 and 2 the spring 29 forces the curved contact surfaces 18 of the stripper elements 15 and 16 into the slot 11 and on the circumferential bottom surface 12 so that no matter whether the knife 10 is rotating clockwise or counterclockwise, one of the sharp ends 17 will clear out any cardboard strips and scraps which may be present in the slot. In this way the knife element 10 will be maintained clean and clear of all cut scrap material.

The stripper elements 15 and 16 may be made of cast iron, steel, aluminum or any other suitable metal or material including a wide variety of alloys. By suitably shifting the rod 24 to the right or left as indicated by the double arrow 25 in Figure 1, the stripper members 15 and 16 may assume any desired position below the cooperating cutters 9 and 10, such as the angular position of Figure 1 relative to the vertical or a perpendicular position as shown in Figure 2.

The bolt 27 may be fixed in the stripper 15, if desired, and thus by loosening the nut shown in Figure 1 adjacent the stripper 16, the strippers 15 and 16 may move relative to each other pulled by the spring 29 and as permitted by the slot 28 in the stripper 16. The spring 29 is of sufficient strength to pull the stripper elements 15 and 16 toward each other so that the surfaces 18 will slide on the bottom surface 12 to clear the groove 11. As desired the bolt 27 is just tight enough to permit relative movement between the blade elements 15 and 16. The slot 28 permits greater movement of the stripper 16 relative to the stripper 15.

As shown by Figure 3 and also by Figure 2, the base or lower ends 20 are in sliding contact with each other and at the bent portions 26, the blade elements 15 and 16 will be arranged in a single plane to follow the slot 11 of the knife element 10.

It will be obvious from Figures 1 and 2 that the strippers 15 and 16 are identical elements except that the stripper 16 is provided with a slot 28 whereas stripper 15 is provided with a hole through which the bolt passes. Each pin 30 is secured to its stripper by any suitable means as by screwthreads or by a welding method or by any other suitable means.

The operation of the strippers is obvious from the foregoing description and the drawing. The strippers may be applied by first placing one stripper with its slot 22 on the shaft or rod 24 and then similarly the other stripper is applied in opposed relationship as shown in Figure 2. Then the bolt 27 is inserted through the slot in the stripper 16 and the hole in the stripper 15 and finally the spring 29 is secured to the pins 30 to thereby pull the strippers toward each other. By means of the rod 24, the strippers are adjusted to any desired position as to the angle from the vertical position. Thus in the position of the strippers 15 and 16 with the cardboard passing through the machine as indicated by the path of movement 8, the knives 9 and 10 will cut the required slot in the cardboard. The cut pieces of cardboard carried along in the slot 11 will be stripped out of this slot in the knife 10 by means of the stripper 16 and particularly by the pointed end 17. Each stripper 15 and 16 is preferably of a width corresponding almost exactly to the width of the slot 11 with just enough clearance to fit between the sides of the slot. Irrespective of the direction of rotation of the knife 10, one of the stripper blades 15 and 16 will clean and clear any cardboard strip material from the slot 11.

For the operation of the strippers it is, of course, necessary that the pointed ends 17 shall contact the bottom 12 of the slot 11.

The bolt 27 forms the pivot member for the relative movement of the stripper members 15 and 16 and the spring 29 aids in urging the strippers and the sharp ends 17 toward each other supported on the rod 24.

The present invention is not to be confined to any strict conformity with the showing in the drawing, and changes or modifications may be made therein insofar as such changes or modifications mark no material departure from the salient features of the invention as set forth and defined in the appended claims.

I claim as my invention:

1. A stripper device for a printer slotter and like machines for cutting slots in cardboard by means of a slotter cutter, comprising a pair of strippers each having a blade portion with a sharp end and a curved contact surface adapted to contact the bottom surface of the slotter cutter to clean out cut strips of cardboard, each stripper having a forked end integral with the blade portion, a bar engaging the forked ends of the strippers to adjust the strippers around the slotter cutter as a unit upon movement of the bar, means connected to the blade portions to urge the strippers toward each other in engaging contact with the slotter cutter by the curved contact surfaces of the blade portions, and pivot means in the forked ends of the strippers so that the latter will be held together in a position wherein the blade portions may be capable of limited movement.

2. A stripper device for a printer slotter and like machines for cutting slots in cardboard by means of a slotter cutter, comprising a pair of strippers each having a blade portion with a sharp end and a curved contact surface adapted to contact the bottom surface of the slotter cutter to clean out cut strips of cardboard, each stripper having a forked end integral with the blade portion, a bar engaging the forked ends of the strippers to adjust the strippers around the slotter cutter as a unit upon movement of the bar, means connected to the blade portions to urge the strippers toward each other in engaging contact with the slotter cutter by the curved contact surfaces of the blade portions, a tension spring connected to the blade portions to urge the strippers toward each other in engaging contact with the slotter cutter by the curved contact surfaces of the blade portions, and pivot means in the forked ends of the strippers so that the latter will be held together in a position wherein the blade portions may be capable of limited movement.

3. A stripper device according to claim 2, in which one of the strippers is provided with a slot in the pivot means to permit limited relative adjustment as between the strippers.

4. A stripper device according to claim 2, in which one of the strippers is provided with a slot in the pivot means to permit limited relative adjustment as between the strippers, and in which the last-mentioned means is in the form of a tension spring.

References Cited in the file of this patent

UNITED STATES PATENTS

| | | |
|---|---|---|
| 360,032 | Malone | Mar. 29, 1887 |
| 1,085,041 | Haughey | Jan. 20, 1914 |
| 1,636,198 | Schroeder | July 19, 1927 |
| 2,420,061 | Adams | May 6, 1947 |